United States Patent
Blais et al.

(10) Patent No.: US 11,487,268 B2
(45) Date of Patent: Nov. 1, 2022

(54) METHOD OF CALIBRATING A MACHINE HAVING AT LEAST TWO ROTATION AXES

(71) Applicant: PRATT & WHITNEY CANADA CORP., Longueuil (CA)

(72) Inventors: Mario Blais, Varennes (CA); Clement Drouin Laberge, Terrebonne (CA); Visal Ing, Ste. Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 44 days.

(21) Appl. No.: 16/521,710

(22) Filed: Jul. 25, 2019

(65) Prior Publication Data

US 2021/0026318 A1    Jan. 28, 2021

(51) Int. Cl.
*G05B 19/402*    (2006.01)
*B23Q 17/22*    (2006.01)
*G06F 17/16*    (2006.01)

(52) U.S. Cl.
CPC ....... *G05B 19/402* (2013.01); *B23Q 17/2241* (2013.01); *G05B 2219/30* (2013.01); *G05B 2219/33099* (2013.01); *G05B 2219/41092* (2013.01); *G05B 2219/50297* (2013.01); *G06F 17/16* (2013.01)

(58) Field of Classification Search
CPC .............. G05B 19/402; G05B 2219/30; G05B 2219/33099; G05B 2219/41092; G05B 2219/50297; B23Q 17/2241; G06F 17/16
See application file for complete search history.

(56) References Cited

U.S. PATENT DOCUMENTS

| | | |
|---|---|---|
| 5,170,279 A | 12/1992 | Schwartz et al. |
| 7,245,982 B2 | 7/2007 | Morfino |
| 9,784,554 B2 | 10/2017 | Gray |
| 9,910,422 B2 * | 3/2018 | Matsushita .......... G05B 19/404 |
| 2009/0051935 A1 * | 2/2009 | Cooper ................ G02B 26/101 |
| | | 356/616 |
| 2010/0207567 A1 | 8/2010 | Mori et al. |
| 2013/0253871 A1 * | 9/2013 | Gray ........................ G01B 5/25 |
| | | 702/95 |
| 2015/0177727 A1 | 6/2015 | Shimizu |

(Continued)

FOREIGN PATENT DOCUMENTS

EP    3327524    5/2018
WO    2017015656    1/2017

OTHER PUBLICATIONS

Bruno Siciliano et al., Robotics—Chapters 2-4, Dec. 31, 2009, Springer, London.

*Primary Examiner* — Kenneth M Lo
*Assistant Examiner* — Tameem D Siddiquee
(74) *Attorney, Agent, or Firm* — Norton Rose Fulbright Canada LLP

(57) ABSTRACT

The method can include measuring the tridimensional positions of a reference feature for a first at least three different angular positions of the reference feature around the first rotation axis and a same first reference angular position around the second rotation axis, the reference feature being fixed relative to the component; and measuring the tridimensional positions of the reference feature for a second at least three different angular positions of the reference feature around the first rotation axis and a same second reference angular position around the second rotation axis.

20 Claims, 6 Drawing Sheets

(56) References Cited

U.S. PATENT DOCUMENTS

| | | | |
|---|---|---|---|
| 2016/0116275 A1 | 4/2016 | Matsushita et al. | |
| 2018/0136626 A1* | 5/2018 | Gu | G05B 19/402 |
| 2019/0029632 A1* | 1/2019 | Yang | G01T 7/005 |
| 2019/0384253 A1* | 12/2019 | Ozeki | G06N 20/00 |

* cited by examiner

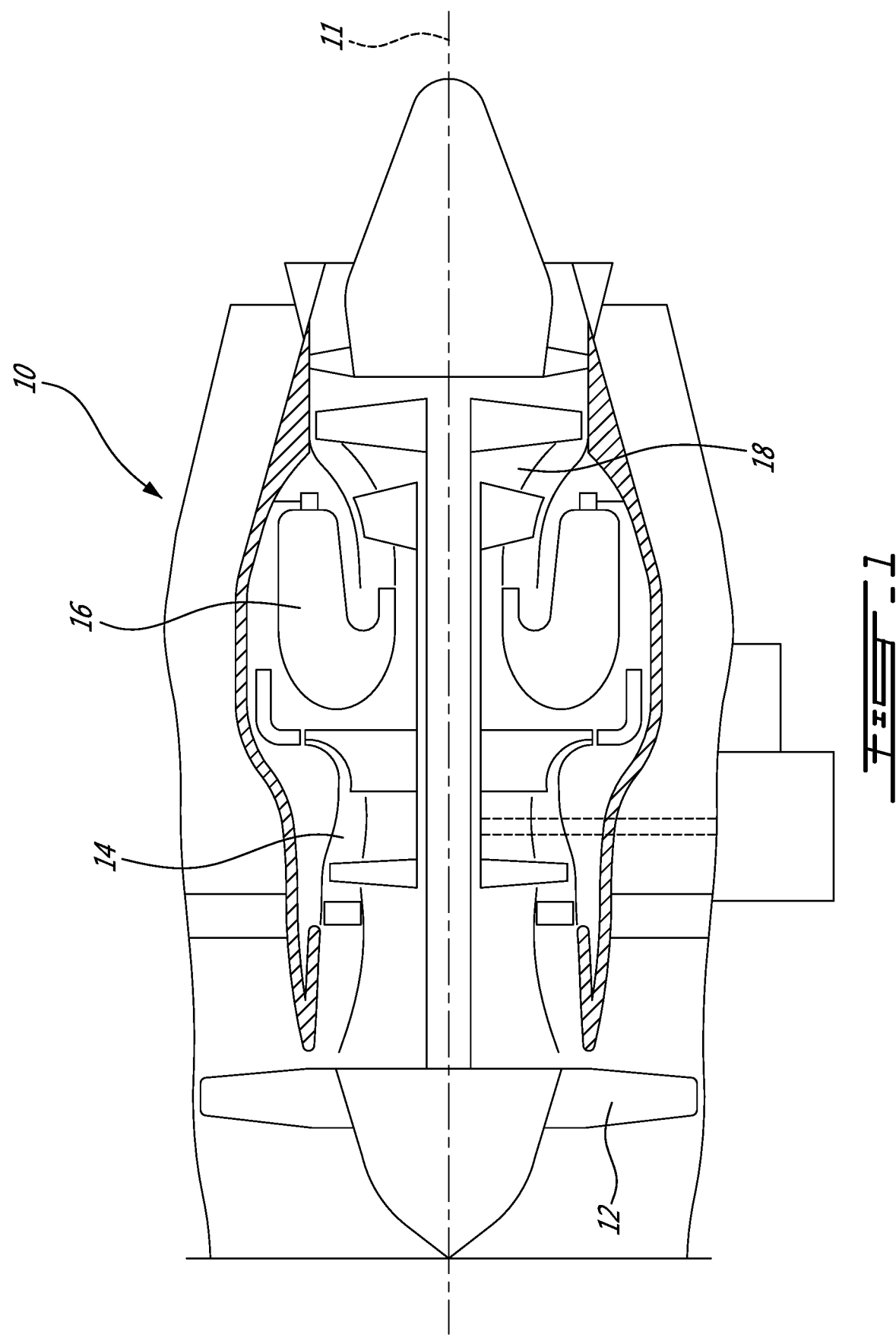

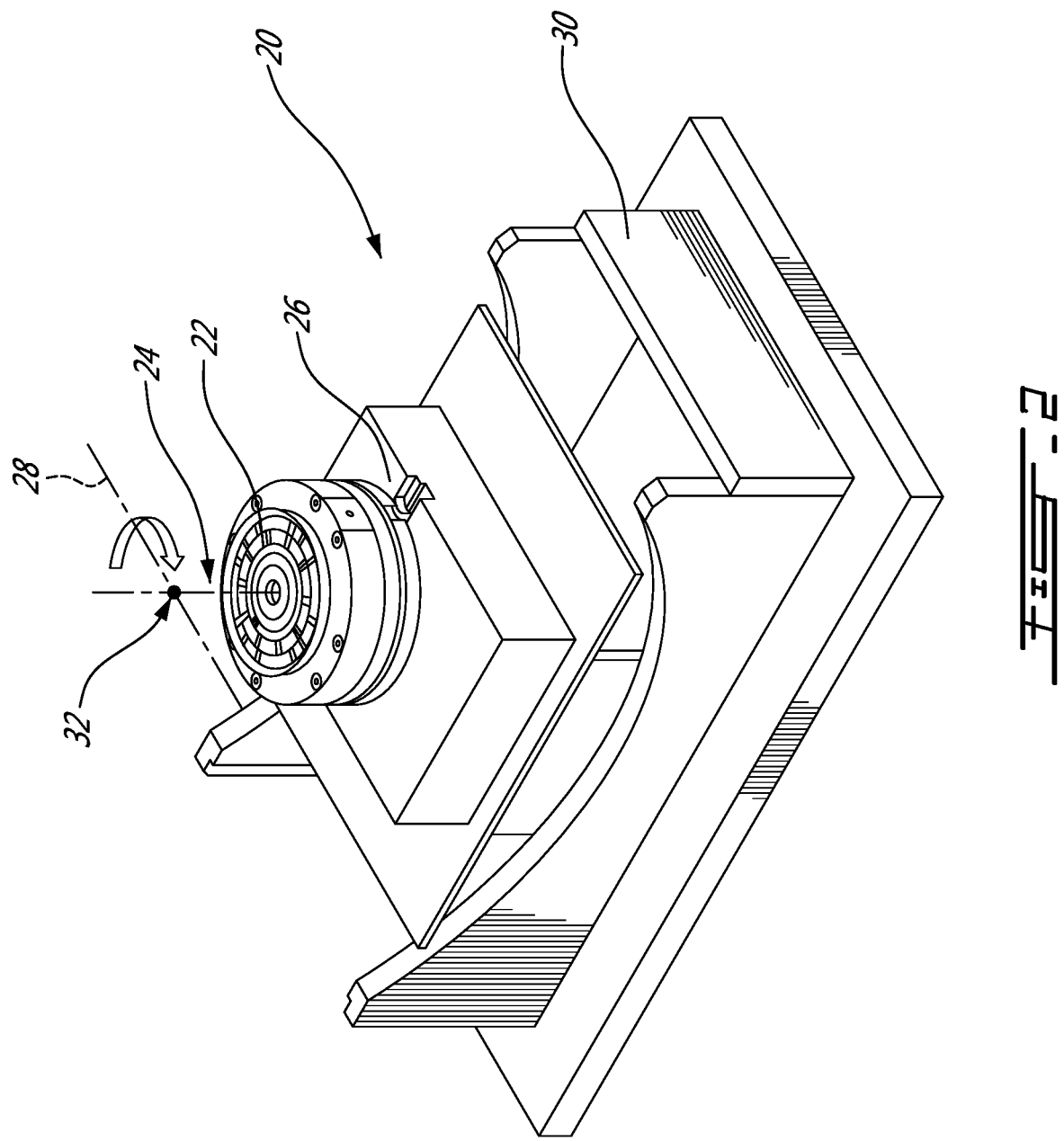

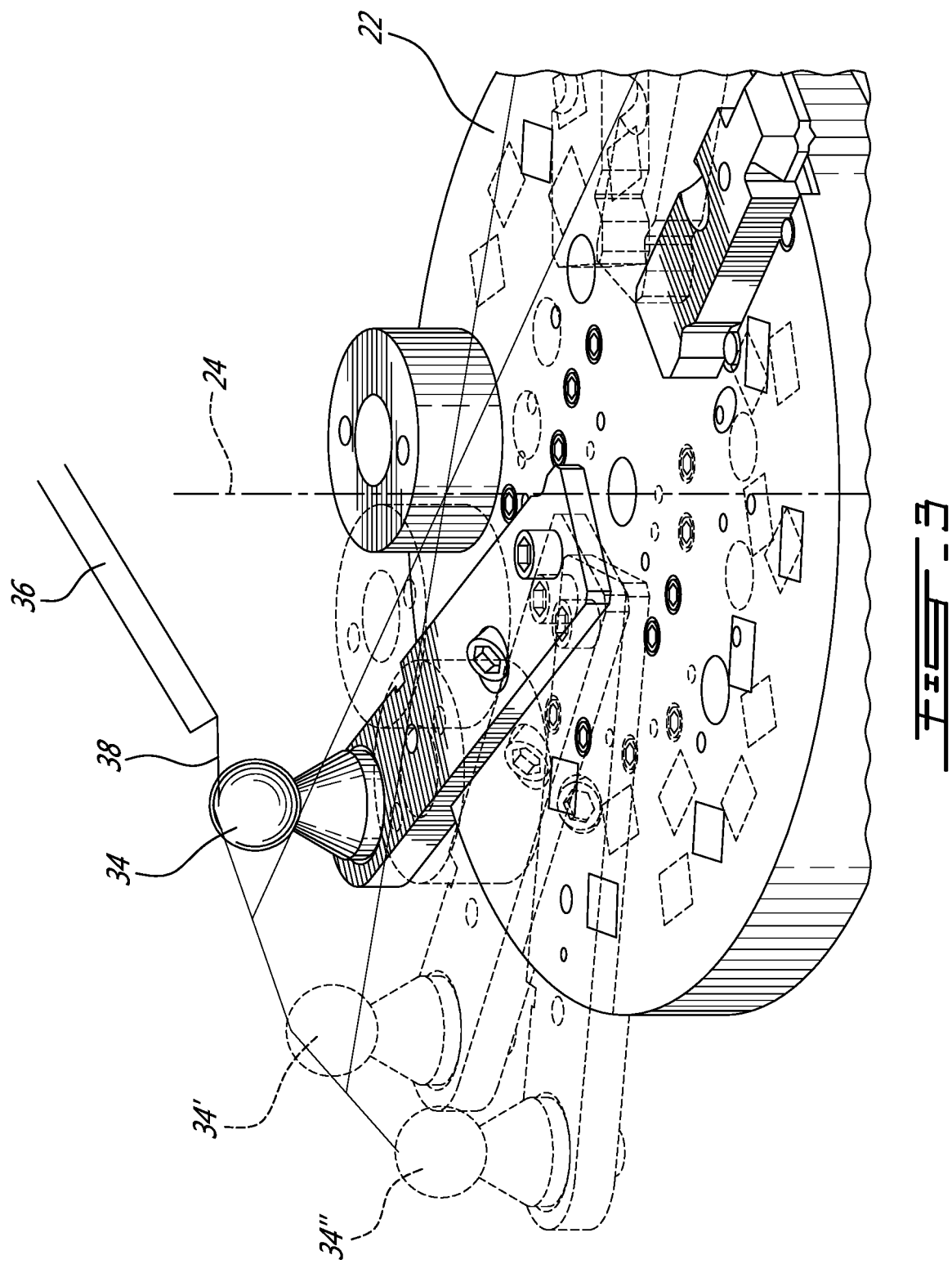

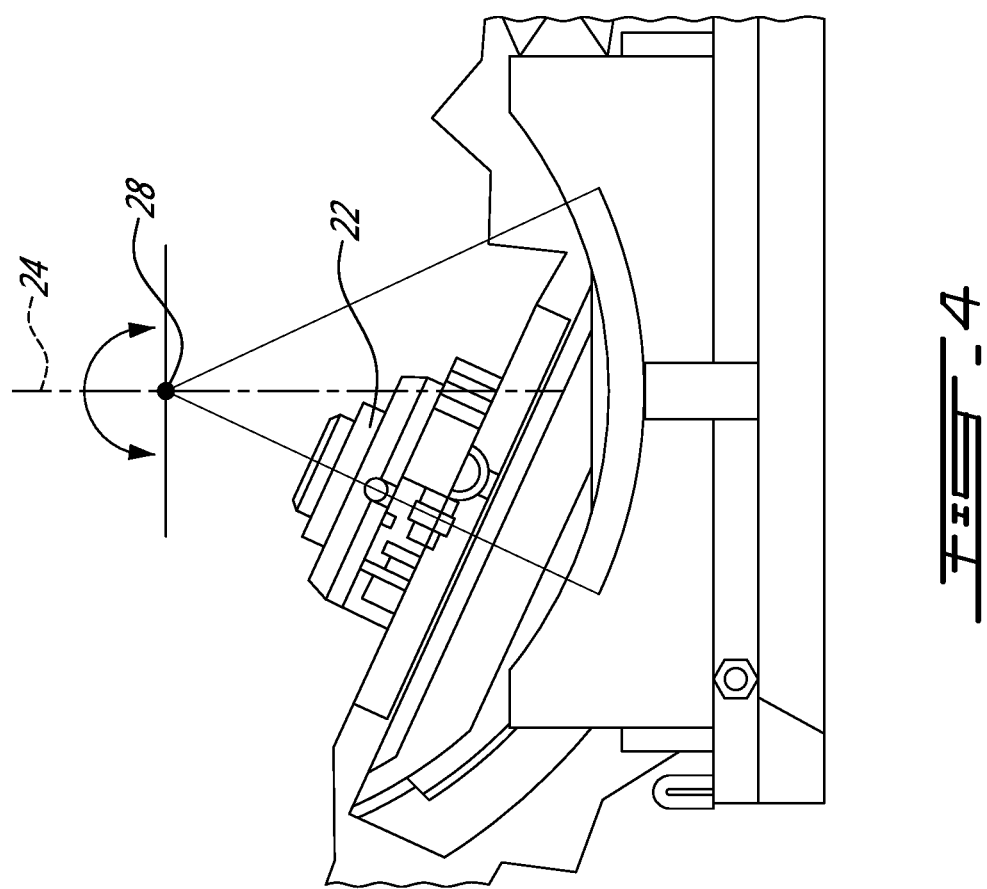

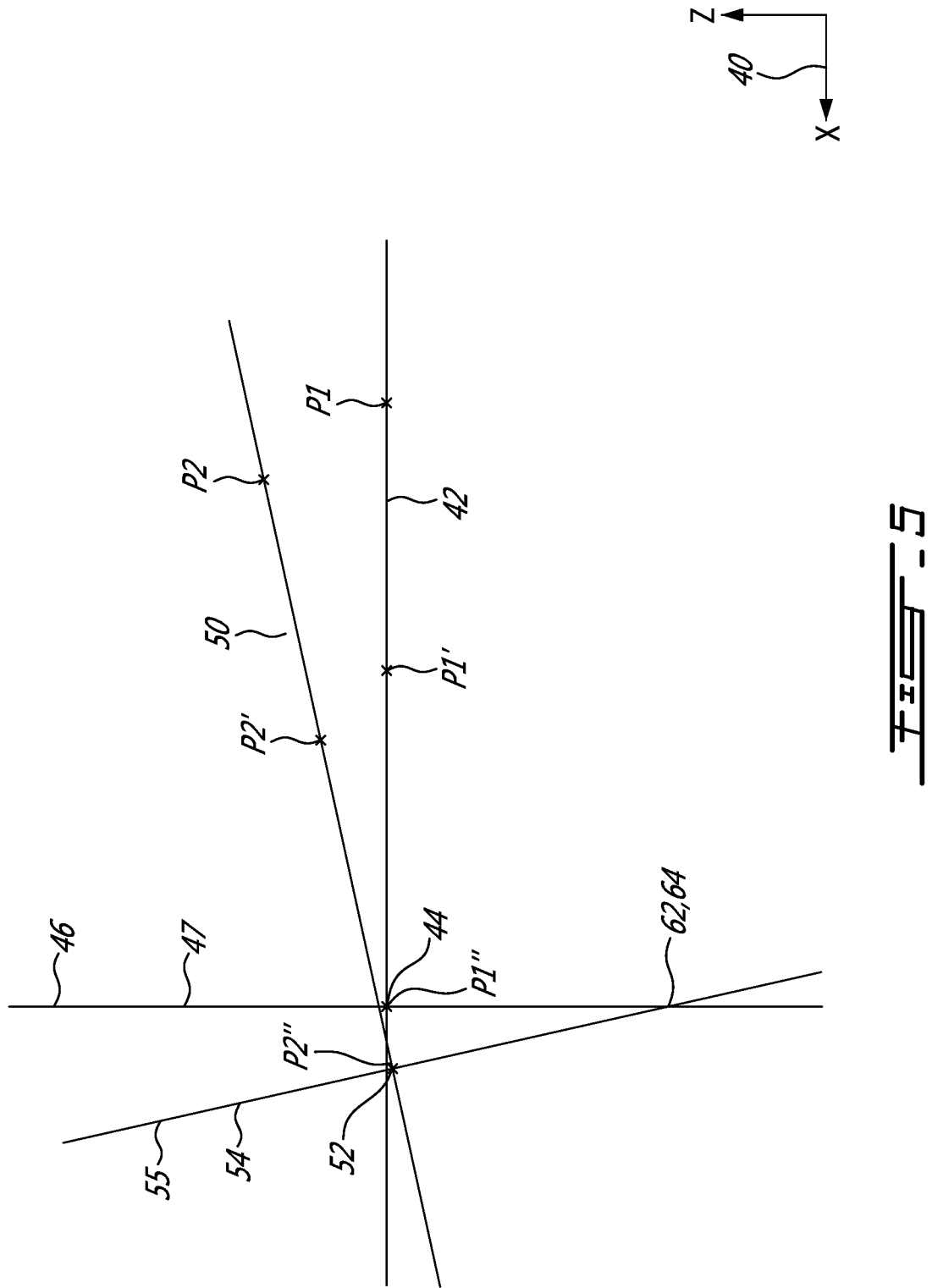

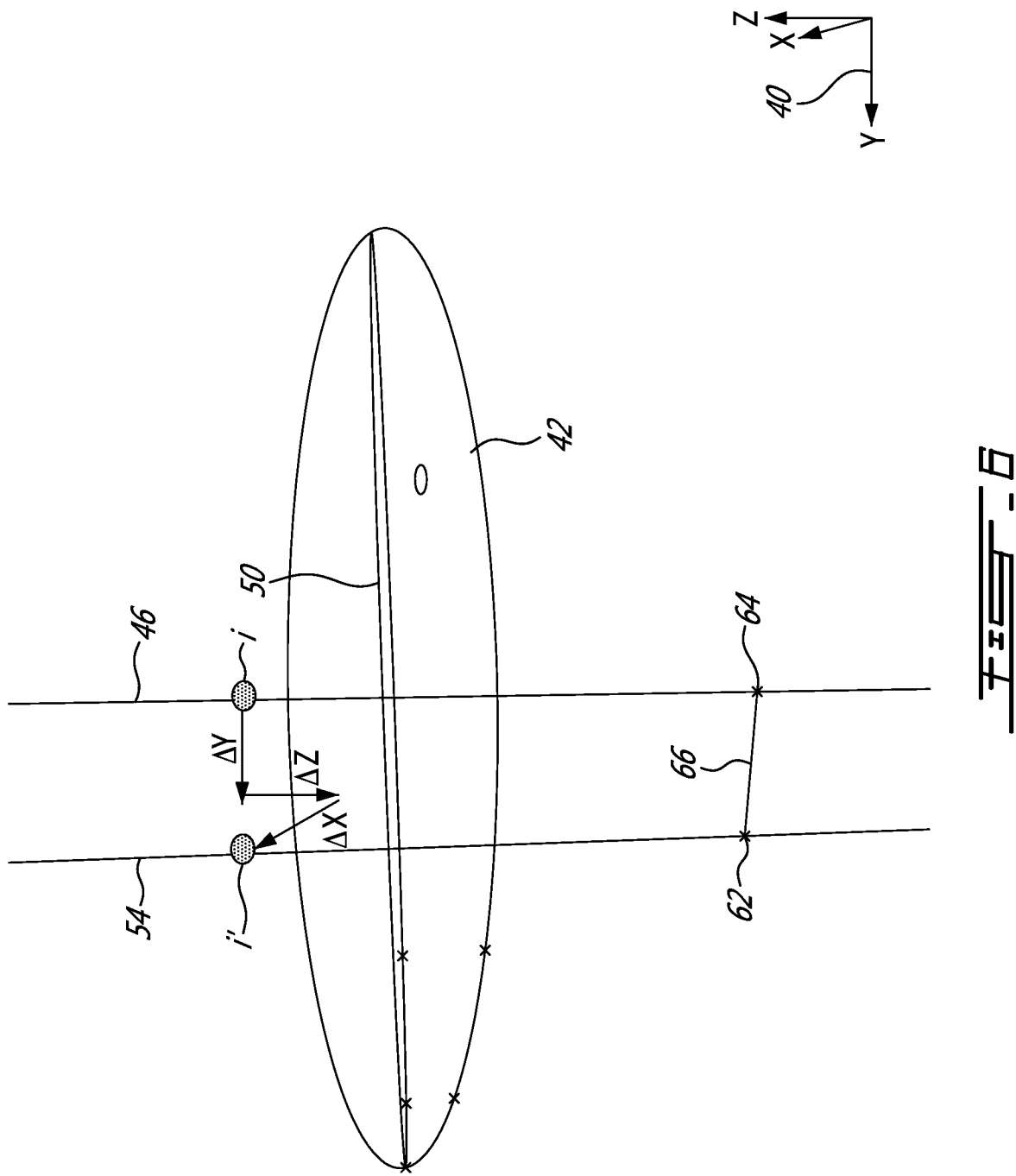

US 11,487,268 B2

METHOD OF CALIBRATING A MACHINE HAVING AT LEAST TWO ROTATION AXES

TECHNICAL FIELD

The application related generally to computer numerical control (CNC) machining and, more particularly, to a method of calibrating a machine which has at least two rotation axes.

BACKGROUND OF THE ART

While CNC machines are satisfactory to a certain extent, greater and greater degrees of precision, operability, and practicality are expected from CNC machines as time passes. There always remains room for improvement.

SUMMARY

In one aspect, there is provided a method of calibrating a machine having a component rotatable around both a first rotation axis and a second rotation axis, the method comprising: measuring the tridimensional positions of a reference feature for a first at least three different angular positions of the reference feature around the first rotation axis and a same first reference angular position around the second rotation axis, the reference feature being fixed relative to the component; measuring the tridimensional positions of the reference feature for a second at least three different angular positions of the reference feature around the first rotation axis and a same second reference angular position around the second rotation axis; using a computer, and based on the measured tridimensional positions: determining a first coordinate system of the component at the first reference angular position and calibrating a reference coordinate system of the machine based on the first coordinate system for operating the machine with the component at the first reference angular position; and determining a second coordinate system of the component at the second reference angular position and calibrating the reference coordinate system of the machine based on the second coordinate system for operating the machine with the component at the second reference angular position.

In another aspect, there is provided a computer implemented method of operating a CNC machine having a component rotatable around both a first rotation axis and a second rotation axis, the method comprising: measuring the tridimensional positions of a reference feature for a first at least three different angular positions of the reference feature around the first rotation axis and a same first reference angular position around the second rotation axis, the reference feature being fixed relative to the component; measuring the tridimensional positions of the reference feature for a second at least three different angular positions of the reference feature around the first rotation axis and a same second reference angular position around the second rotation axis; based on the measured tridimensional positions: determining a first coordinate system of the component at the first reference angular position; and determining a second coordinate system of the component at the second reference angular position; and operating the CNC machine at the first reference angular position based on the first coordinate system; and operating the CNC machine at the second reference angular position based on the second coordinate system.

In accordance with a further aspect, there is provided a computer program product stored in a non-transitory memory having instructions readable by a CNC machine CNC having a component rotatable around both a first rotation axis and a second rotation axis to perform the steps of: measuring the tridimensional positions of a reference feature for a first at least three different angular positions of the reference feature around the first rotation axis and a same first reference angular position around the second rotation axis, the reference feature being fixed relative to the component; measuring the tridimensional positions of the reference feature for a second at least three different angular positions of the reference feature around the first rotation axis and a same second reference angular position around the second rotation axis; based on the measured tridimensional positions: determining a first coordinate system of the component at the first reference angular position; and determining a second coordinate system of the component at the second reference angular position. The CNC machine can then be operated in a manner to take into account the second coordinate system when operating in the second reference angular position and to be operated in a manner to take into account the first coordinate system when operating in the first reference angular position.

DESCRIPTION OF THE DRAWINGS

Reference is now made to the accompanying figures in which:

FIG. 1 is a schematic cross-sectional view of a gas turbine engine;

FIG. 2 is a partial oblique view of a machine having two rotation axes;

FIG. 3 is shows a portion of FIG. 2, while also showing the localisation of a reference feature at three angular positions relative to a first one of the axes;

FIG. 4 schematizes rotation of the machine of FIG. 2 along a second one of the axes;

FIG. 5 illustrates the determination of two coordinate systems, one for each one of two angular positions around the second axis; and FIG. 6 illustrates the determination of two points each along one axis and each closest to a second one of the axes of corresponding coordinate systems.

DETAILED DESCRIPTION

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Many components in gas turbine engines such as the example presented in FIG. 1 are manufactured using CNC machines, and CNC machines are also used for manufacturing components in other industries than the gas turbine engine industry.

One significant feature of CNC machines is the calibration feature. Indeed, CNC machines are typically provided with sensors which can track the relative position of one or more moving part, such as a part holder and/or tool holder for instance, and a software which allows to operate the machine, which involves moving the moving part, in a frame of reference, based on the feedback from the sensors. The sensors can therefore be said to operate in the frame of reference of the CNC machine, and to a certain extent, their signals also define the frame of reference of the CNC machine.

When the CNC software is used for the first time on a given machine, the calibration is used to provide an absolute reference to the relative movements sensed by the sensors. In other words, it can be used to position a virtual reference frame of the CNC machine relatively to the different moveable components of the machine, or more specifically, to the sensor outputs. Calibration can also be used to correct changes in the relative positions of the sensors and moving parts in the machine relative to one another which can occur over time, or due to shocks, for instance.

The sensors are the eyes of the CNC machine which allows the software to know where the moving part is located. The software is used for many different machines, which may have slight variations in the frame of reference from one machine to another. The CNC machine can thus be calibrated to take into account the reality of the machine. The calibration can involve setting an origin and an orientation of the frame of reference based on the measured position of reference elements in the actual CNC machine. The reference elements can constitute a coordinate system, and the calibration can involve setting the origin and orientation of axes of the frame of reference of the machine relative to this coordinate system. Typically, the components are moveable in three dimensions and the frame of reference of the machine is thus 3-dimensional. It can use Cartesian coordinates, cylindrical coordinates, or spherical coordinates, to name three examples, depending on what was considered most suitable by the software engineers based on the specifics of the actual machine the software is designed for.

In many production environments, several CNC machines are used to produce multiple components simultaneously. Performance of CNC machines is typically assessed by taking into consideration the degree of precision achieved and the speed of execution of various tasks, but also in terms of practicality (user-friendliness).

Some CNC machines have a component which is moved around more than one rotation axis during operation. The rotated component can be a part holder, or a tool holder, for instance, as in some cases the tool has greater movement ability than the part, and in others, it is the part which has greater movement ability than the tool. In some cases the tool has more degrees of freedom than the part during operation of the machine, whereas in others, it is the part which is moved over more degrees of freedom than the tool during operation.

To achieve high precision, CNC machines typically need one form or another of calibration. Ideally, the position and orientation of a second one of the rotation axes would remain perfectly fixed relative to the component at different angular positions around the second rotation axis, but in practice, mechanisms to move the component around rotation axis are typically imperfect, especially when more than one rotation axis is in play, and the position of the second rotation axis may move relative to a reference frame of, or coordinated system fixed relative to, the component for different angular positions around the second rotation axis, and this can be a source of inaccuracy when operating the machine, i.e. when machining the part based on the latter form of calibration.

Indeed, if the rotation around the second rotation axis is modelized by the machine as a mathematical rotation around the second rotation axis, whereas in reality a translation and/or rotation around another rotation axis occurs in addition to the rotation around the second rotation axis, the part will not be exactly at the position the tool expects it to be, or vice versa, and the tool will perform the machining slightly offset, or disoriented, relative to the position and orientation where it should be performing the machining, resulting in variations in the finished parts which may not meet the predetermined geometrical tolerances.

It was found that such a source of inaccuracy can be alleviated by a calibration method which will now be explained in reference to a first example.

FIG. 2 shows an example of a machine 20 in which a component can be rotated around a first rotation axis 24. The component is a part holder 22 in this specific example. More specifically, the part holder 22 is mounted in a carriage 26 via a bearing assembly (not shown), and the part holder 22 can be rotated around the first rotation axis 24 relative to the carriage 26 via the bearing assembly. In practice, CNC machines are typically provided with a tracking device such as an encoder which is used to provide a signal indicative of the angular position of the component around the first axis 24. Accordingly, a computer receiving the signal can determine the angular position of the component around the first axis 24.

Still referring to the machine 20 illustrated in FIG. 2, the part holder 22 can also be rotated around a second rotation axis 28. More specifically, the carriage 26 itself is received on a cradle support 30 defining an arc-shaped carriage path along which the carriage 26 can be displaced in a manner for the part holder 22 to be rotated around a second rotation axis 28. In practice, CNC machines are typically provided with a tracking device such as an encoder to provide a signal indicative of the angular position of the component around the second axis 28, and a computer receiving the signal can determine the angular position of the component around the second axis 28. In this example, the second rotation axis 28 is, in theory, orthogonal to the first rotation axis 24, and intersects the first rotation axis 24 at a specific point referred to as the pivot point 32. The second rotation axis may be non-orthogonal to the first rotation axis in other embodiments.

Theoretically, the part holder 22 would always be at the same distance from the pivot point 32, and the second rotation axis 28 would always be perfectly aligned with a center of the part holder 22. In other words, the second rotation axis 28 would always be at a fixed height, fixed transversal position, and fixed orientation in the frame of reference of the part holder 22, independently of which angular position the carriage 26 occupies along the cradle support 30. In practice, the cradle support 30 will not be perfectly arc-shaped, and due to variations off the perfect arc-shape, the position of the second rotation axis 28 will actually vary, in the frame of reference of the part holder 22, depending on the angular position of the carriage 26 along the cradle support 30. More specifically, relative to the corresponding position and orientation at a first reference angular position around the second rotation axis, the distance between the second rotation axis and the part holder, the transversal position of the second rotation axis, and/or the orientation of the second rotation axis may have changed at a second reference position around the second rotation axis. Similar issues can occur with the rotation axis of the part holder relative to the carriage, which can be referred to as the first rotation axis for instance, but in this embodiment, the changes in the relative position of the first rotation axis were negligible compared to the changes in the relative position of the second rotation axis. Similar issues can also occur with one or more additional rotation axes in cases where the component, be it a part holder or a tool holder, is rotatable around three, or more, rotation axes. Accordingly, it is to be understood that the detailed description of the following example is extendible to such other contexts.

Let us now explore the possible effect of such a possible source of inaccuracy. Let us consider a scenario where the movement of the part holder 22 is modeled as being a perfect rotation around the carriage/cradle support rotation axis 28. In this scenario, one will assume that the part holder has undergone a perfect rotation around this rotation axis 28, and the extent of this perfect rotation is determined based on the signal received from the tracking device. Let us consider a scenario where the tool holder begins machining the part at a first angular position around that axis 28 according to a first set of computer-readable instructions, and then moves on to continue to machine the part at a second angular position around that axis 28. The machine expects the part to be at the same position and orientation relative to the part holder, plus a mathematical rotation around the second rotation axis 28. However, due to imperfections in the carriage/cradle support articulation, the part is in fact somewhat offset and somewhat disoriented relative to that expected orientation. Otherwise said, the position of the pivot point may have moved relative to the part holder between the two angular positions, rather than being at exactly the same point. This will lead to a discontinuity in the machining precision between the two angular positions, and this discontinuity will depend on the extent of the axis' displacement between the two angular positions. It was found possible to factor out, or at least significantly alleviate, such a source of inaccuracy as follows.

Firstly, the component can be placed at a first reference angular position around the second axis, such as shown in FIG. 2 for instance, at a first angular position around the first axis, such as shown in solid lines in FIG. 3 for instance. The position of a reference feature 34 associated to the component is measured using an automated measuring system, in a reference frame of the machine, which, if the component is the part holder 22, can be the control reference frame of the tool holder 36 for instance. The reference feature can be any suitable reference feature which is fixed relative to the component, including part of the component itself. In this embodiment, as shown in FIG. 3, it was found suitable that the reference feature 34 be a sphere fixedly mounted on the part holder 22 for the duration of the measurements. The automated measuring system can be any suitable automated measuring system. In one embodiment, the automated measuring system can include a touch probe 38 mounted to the tool holder 36 of the machine, for instance. In another embodiment, the automated measuring system can include a 3D scanner fixed to a frame of the machine, for instance.

While maintaining the angular position around the second rotation axis 28, which is the carriage/cradle support rotation axis in this specific example, the component is then rotated to a second angular position around the first axis 24, where the position of the reference feature 34' is again measured, and the component is then rotated to a third angular position around the first axis, where the position of the reference feature 34" is again measured, in a process schematized in FIG. 3. If desired, the position of the reference feature 34 can be measured for additional angular positions around the first axis 24. In practice, the angular positions are "measured" via a computer which determines coordinates in a reference system of the machine based on the signal received from the automated measuring system.

From these three, or more, measured positions, a computer can determine a) a position and orientation of the first rotation axis, and b) a reference point along that axis relative to the position of the component, for the first reference angular position around the second axis. This can involve determining a circle, or arc, including the three or more measured positions, determining the center point of this circle or arc, determining a plane with which this circle or arc coincides, and determining the rotation axis as being normal to the plane, and containing the center point. The reference point along that axis can be any suitable reference point along that axis, such as the center point, or the height of a reference feature of the component along that axis, for instance. In this embodiment, it was found preferable that the reference point be associated to a point considered closest to the second rotation axis, as this may make any reference frame adjustments easier to compute, for instance. The determined position and orientation of the axis and of the reference point along the axis can then be used as the basis of a coordinate system for operating the machine when the component is in the first reference angular position around the second axis. In other words, the machine can be calibrated to operate on the basis of the measured position and orientation of the axis and of the reference point at the first angular reference position around the second axis. This coordinate system can have its origin located at a location along the axis which is considered to be the pivot point, for instance. Alternately, the position of the pivot point can be refined using the measurements taken at a second reference angular position, or additional reference angular positions, such as the example presented below, to name an example.

Then, the component can be rotated to a second reference angular position around the second rotation axis 28. In this example, this can be done by moving the carriage 26 long the cradle support 30, such as schematized in FIG. 4, for instance. Then the process which was presented above to determine a first coordinate system associated with the first reference angular position, say 0 degrees for instance, around the second rotation axis 28, is then repeated for the second reference angular position, say 12.5 degrees for instance, around the second rotation axis 28, including measuring the position of the reference feature at three or more angular positions relative to the first rotation axis 24 while maintaining the second reference angular position of 12.5 degrees around the second rotation axis, and determining a position and orientation of the first rotation axis and of a reference point along that axis relative to the position of the component, at the second reference angular position around the second axis.

It will be understood that for the tool to reach the correct positions on the part held in the part holder when the machine operates at the second reference angular position around the second rotation axis, the machine must adjust its coordinate system to take into account the rotation around the second rotation axis. Here, instead of simply adjusting the frame of reference as a function of a mathematical rotation made relative to a predetermined pivot point, based on the measured position of the carriage along the cradle support, a difference can be made between the position and orientation of the second coordinate system, obtained via the measurements taken at 12.5 degrees, and the position and orientation of the first coordinate system, obtained via the measurements taken at 0 degrees. The operation will be, to a certain extent, more complex than performing a mathematical rotation, but it will also lead to more accurate operation of the machine.

Indeed, the determined position and orientation of the first rotation axis and of the reference point along that axis is then used as a basis of a coordinate system for operating the machine when the component is in the second reference angular position around the second axis. Accordingly, the inaccuracies caused by the practical imperfections of the carriage/cradle support rotation are factored out or at least alleviated by contrast with a method which assumes that the position and orientation of the first rotation axis and of the reference point along that axis at the second reference angular position corresponds to a mathematical rotation of these features around the second rotation axis from the corresponding features determined for the first reference angular position.

In practice, it can be considered practical for the computer to calculate a difference between the coordinate systems determined for the first and second reference angular positions. This difference can take the form of a displacement matrix, for instance, where a tridimensional displacement value is associated to each point in the first reference position, which leads to a corresponding point in space relative to the component in the second reference position when applied. The displacement matrix can integrate a translation of an origin of the coordinate system in addition to a rotation thereof. Alternately, the difference can take the form of a mathematical equation which includes a translation of an origin of the coordinate system in addition to a rotation around an origin thereof, for instance. Accordingly, from the reference point of view of the machine tool, to follow up on the example presented above, the machine tool can simply see its instruction coordinates transformed, potentially by a combination of a translation and a rotation, which can take the form of a the displacement matrix, or of an equation, as opposed to seeing its instruction coordinates transformed by a simple rotation around a theoretical second rotation axis, when the component is moved to the second reference angular position.

Even the coordinate system used to machine the part at the first reference angular position can be refined based on the measurements performed at the second reference angular position. Indeed, instead of setting an origin, or other reference point, at a theoretical pivot point along the axis determined using the measurements performed at the first reference angular position, the position of such origin or other reference point can be adjusted to correspond to the point along the axis determined at the first reference angular position which is closest to the axis determined at the second reference angular position, in the reference frame of the machine.

If a given part is predetermined to also require machining at a third reference angular position, the process can be repeated to determine a third coordinate system for the third reference angular position, and to transform the instruction coordinates by the corresponding displacement matrix, for instance. Alternately, it may be possible, or considered satisfactory, in certain embodiments to calibrate a machine by establishing coordinate systems such as presented above for a number of reference angular positions, and to interpolate or extrapolate a displacement matrix at angular positions which are between or otherwise different from the reference angular positions, in a manner that when a part needs to be machined at an angular position which does not correspond to any one of the reference angular positions, a displacement matrix obtained via an interpolation or extrapolation can be used in a manner to avoid having to perform a calibration specific to that specific angular position.

FIGS. 5 and 6 provide a visual representation of an example of the elements which can be obtained using a method such as described above, for a given machine. Undergoing the first step, with measurements taken at 0 degrees around the second axis, leads to the identification of absolute position measurement of three points P1, P1', P1" in the reference system 40 of the machine, which are fitted to a circle 42 of which the center 44 is identified, and an axis 46 is defined to fit with the center point 44, normal to the circle 42. Accordingly, a first coordinate system 47 of the component, at 0 degrees around the second rotation axis, is established, and the machine can be calibrated to take into account the position and orientation of this first coordinate system in its own coordinate system 40. The second step, with measurements taken at 12.5 degrees around the second axis, leads to the identification of an absolute position measurement of three points P2, P2', P2", which are fitted to a circle 50 of which the center 52 is identified, and an axis 54 is defined to fit with the center point 52, normal to the circle 50. Accordingly, a second coordinate system 55 of the component is established at 12.5 degrees around the second axis, and the machine can be calibrated to take into account the position and orientation of this second coordinate system in its own coordinate system 40 when machining the part at 12.5 degrees around the second rotation axis.

In one example embodiment, as will now be explained with reference to FIG. 6, reference points 62, 64 along both axes can then defined by finding the point along each axis which is closest to the other axis. These points can then be considered as the pivot point for each corresponding axis, and the origin of the corresponding coordinate system can be established to be at the corresponding point, if desired. Indeed, such points may undergo minimal displacement and can therefore be practical to use as an origin of the coordinate systems of the part. In FIG. 6, the reference points appear distinct by opposition with FIG. 5 where the points 62, 64 appear to coincide, because they are viewed from a different angle. In practice, the points 62, 64 will never perfectly coincide, and there will always be a vector 66 which can be identified as extending straight from the first point 62 to the second point 64. In another embodiment the pivot point can be established as being a point along the corresponding axis which is at a predetermined distance from the circle, for instance. Using a computer, knowing the position of both axes 46 and 54 in the reference frame 40 of the machine, and on the basis of established reference points 62 and 64 for instance, for any point i on the part to be machined at 0 degrees around the second axis, the corresponding same point i' of the part to be machined, but at 12.5 degrees (or any other second reference angular position) around the second axis, can be calculated in the reference point of the machine. The same process can be repeated by all points in the first coordinate system to provide a displacement matrix which, when applied to any point associated to the first coordinate system, will yield the corresponding point in the second coordinate system. Given imperfections in the articulation of the second axis, there will be a difference between the position of this point i' as calculated above, and the position of the corresponding point based on a perfect mathematical rotation around the theoretical position of the second rotation axis, and the point i' as calculated above, will provide a more precise indication of the corresponding point on the part to be machined.

Practically speaking, the following values can be defined:
720{ANGLE B}=0
721{CENTER TABLE X}=#100
722{CENTER TABLE Y}=#101
723{CENTER TABLE Z}=#102
724{RADIUS}=#103
725{A}=#104
726{B}=#105

727{C}=#106
728{D}=#107
729{ANGLE B}=ATAN[#725]/[#727]
730{ANGLE AXE X}=ATAN[#726]/[#727]
731{AXO U}=#3207
732{AXO V}=#3208
733{AXO Z}=#3209
734{CENTER X SPHERE}=#131
735{CENTER Y SPHERE}=#132
736{CENTER Z SPHERE}=#133
780{ANGLE B}=12.5
781{CENTER TABLE X}=#100+#3142
782{CENTER TABLE Y}=#101+#3143
783{CENTER TABLE Z}=#102+#3146
784{A}=#104
785{B}=#105
786{C}=#106
787{CRP X}=[#179*[#725+#784]+[#721+#3142]+#781]/2
788{CRP Y0-12.5}=#179*#726+#722+#3143
789{CRP Y12.5}=#179*#785+#782
790{CRP Z}=#179*#786+#783
791{ANGLE B}=ATA N [#784]/[#786]
792{ANGLE AXE X}=ATAN[#785]/[#786]
793{AXO U}=#3207
794{AXO V}=#3208
795{AXO Z}=#3209
796{COMP CRP X}=#197
797{COMP CRP Y}=#198
798{COMP CRP Z}=#199
Where:
Angle B is the angular position of the component around the second axis.
721-#723 are the coordinates of the center of rotation at B0
725-#728: the equation of the plane at B0=Ax+By+Xz+D, normal axis=A=i, B=j, C=k
734-#736: reference coordinates at B0 for simulation
781-#783: coordinates of the center of rotation at B12.5
784-#786: equation of the plane at B12.5=Ax+By+Xz+D, normal axis=A=i, B=j, C=k
787-#790: coordinates of the theoretical pivot point at B12.5 with correspondence at B0
796-#798: difference between theoretical position based on pure rotation and actual position based on measurements made at B12.5

It will be understood that a similar approach can be taken to make corrections on the basis of measurements taken at other angles around the second axis than 12.5 degrees.

It will be understood that the expression "computer" as used herein is not to be interpreted in a limiting manner. It is rather used in a broad sense to generally refer to the combination of some form of one or more processing units and some form of non-transitory memory system accessible by the processing unit(s). The use of the expression "computer" in its singular form as used herein includes within its scope the combination of a two or more computers working collaboratively to perform a given function. Moreover, the expression "computer" as used herein includes within its scope the use of partial capacities of a processing unit of an elaborate computing system also adapted to perform other functions. Similarly, the expression 'controller' as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

In the example presented above, for instance the processor and memory hardware used to obtain the position measurements can be the same as the processor and memory hardware which is used to calculate the coordinate systems based on these measurements, and can be the same as the processor and memory hardware which is used to control the movement of the tool holder or part holder. Alternately different processor and memory hardware elements can be used to perform these three different functions, or to perform subgroups of one or two of these different functions, for instance, and different ones of the processor and memory hardware elements can be equipped with communication devices to allow communication of signals or data via wires or wirelessly, for instance. The expression "computer" as used herein is used generally to refer to either one of such processor and memory hardware elements or to a combination of two or more of such processor and memory hardware elements, for the sake of simplicity.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of manufacturing a part with a machine having a component rotatable around a first rotation axis, the component pivotable about a second rotation axis by moving the component along an arc-shaped cradle, the method comprising:
measuring a first set of 3-dimensional positions of a reference feature for at least three angular positions of the reference feature around the first rotation axis and a first reference angular position around the second rotation axis, the reference feature fixed relative to the component;
determining a first coordinate system of the component at the first reference angular position by determining a position and orientation of the first rotation axis in the first reference angular position and calibrating a reference coordinate system of the machine based on the first coordinate system for operating the machine with the component at the first reference angular position;
machining a first feature in the part when the part is at the first reference angular position by using the first coordinate system;
pivoting the component about the second rotation axis by moving the component along the arc-shaped cradle from the first reference angular position to a second reference angular position, a pivot point defined at an intersection between the first rotation axis and the second rotation axis, the pivot point being axially offset from the component relative to the first rotation axis;

measuring a second set of 3-dimensional positions of the reference feature for at least three angular positions of the reference feature around the first rotation axis and the second reference angular position around the second rotation axis;

determining a second coordinate system of the component at the second reference angular position by determining a position and orientation of the first rotation axis in the second reference angular position and calibrating the reference coordinate system of the machine based on the second coordinate system for operating the machine with the component at the second reference angular position, the calibrating of the reference coordinate system of the machine based on the second coordinate system includes computing a difference between the first coordinate system and the second coordinate system; and machining a second feature in the part when the part is at the second reference angular position by using the computed difference, the machining of the second feature including transforming instruction coordinates of a tool of the machine using the computed difference.

2. The method of claim 1 wherein the first coordinate system and the second coordinate system both include a determined position and orientation of the first rotation axis in a reference coordinate system of the machine.

3. The method of claim 2 further comprising determining a reference point along the determined position and orientation of the first rotation axis for both the first coordinate system and the second coordinate system, the reference points being determined as a point closest to the determined position and orientation of the first rotation axis in the other coordinate system.

4. The method of claim 3 further comprising, defining the reference points as pivot points of the rotation axes.

5. The method of claim 4 further comprising, using establishing a displacement matrix matching every point in the first coordinate system to a corresponding point in the second coordinate system based on the difference between the first coordinate system and the second coordinate system.

6. The method of claim 1 wherein the component is a part holder.

7. The method of claim 1 wherein the measuring is performed with a touch probe handled by a tool holder of the machine.

8. The method of claim 7 wherein the measuring includes controlling the movement of the tool holder.

9. The method of claim 8 wherein the control of the movement of the tool holder during the measurements taken at the second reference angular position is based on a mathematical rotation of the first coordinate system around a theoretical position of the second rotation axis by an angle equivalent to the difference between the first reference angular position and the second reference angular position.

10. The method of claim 1 wherein the first coordinate system and the second coordinate system both include at least an arc fitting the corresponding three angular positions, an axis normal to the arc and intersecting a center of the arc, and a reference position along the length of the axis relative to the center of the arc.

11. The method of claim 10 wherein the position along the length of the axis corresponds to a theoretical position of the second rotation axis.

12. The method of claim 10 wherein the reference position along the length of the axis corresponds to a point closest to the axis of the other coordinate system.

13. The method of claim 1 wherein the component is further rotatable around a third rotation axis, wherein the steps of measuring are performed at a first reference angular position around the third rotation axis, and repeated for at least a second reference angular position around the third rotation axis, the steps of determining are performed for the first reference angular position around the third rotation axis, and repeated for the second reference angular position around the third rotation axis.

14. A computer implemented method of operating a CNC machine having a component rotatable around a first rotation axis, the component pivotable about a second rotation axis by moving the component along an arc-shaped cradle, the method comprising:

measuring a first set of 3-dimensional positions of a reference feature for at least three different angular positions of the reference feature around the first rotation axis and a first reference angular position around the second rotation axis, the reference feature being fixed relative to the component;

pivoting the component about the second rotation axis by moving the component along the arc-shaped cradle from the first reference angular position to a second reference angular position, a pivot point defined at an intersection between the first rotation axis and the second rotation axis, the pivot point being axially offset from the component relative to the first rotation axis;

measuring a second set of 3-dimensional positions of the reference feature for at least three different angular positions of the reference feature around the first rotation axis and the second reference angular position around the second rotation axis;

based on the measured first and second sets of 3-dimensional positions:

determining a first coordinate system of the component at the first reference angular position around the second rotation axis;

determining a second coordinate system of the component at the second reference angular position around the second rotation axis;

computing a difference between the first coordinate system and the second coordinate system;

operating the CNC machine at the first reference angular position based on the first coordinate system;

and operating the CNC machine at the second reference angular position based on the second coordinate system by transforming instruction coordinates of a tool of the machine using the computed difference.

15. The method of claim 14 wherein the component is a part holder, and operating the CNC machine includes moving a tool holder relative to the part holder.

16. The method of claim 14 wherein operating the CNC machine based on the second coordinate system includes determining the difference between the first coordinate system and the second coordinate system, and transforming a reference system of the CNC machine based on the difference.

17. The method of claim 14 comprising calibrating the CNC machine for the first reference angular position including adapting a reference coordinate system of the CNC machine based on the determined first coordinate system.

18. The method of claim 14 wherein the first coordinate system and the second coordinate system both include a determined position and orientation of the first rotation axis in a reference coordinate system of the machine.

19. The method of claim 18 further comprising determining a reference point along the determined position and orientation of the first rotation axis for both the first coordinate system and the second coordinate system, the reference points being determined as a point closest to the determined position and orientation of the first rotation axis in the other coordinate system.

20. The method of claim 19 further comprising, defining the reference points as pivot points of the rotation axes.

* * * * *